Sept. 23, 1952 H. H. PLAGGE 2,611,709
PACKAGE AND STORAGE OF APPLES
Filed May 14, 1949
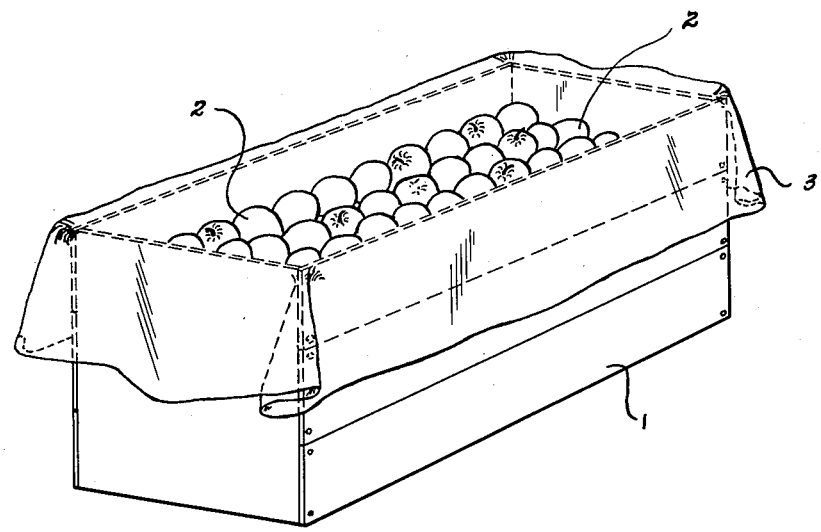
INVENTOR.
HOMER H. PLAGGE, DECEASED
BY ALMA R. PLAGGE, ADMINISTRATRIX
BY R. H. Waters
Attorney Patented Sept. 23, 1952

2,611,709

UNITED STATES PATENT OFFICE 2,611,709

PACKAGE AND STORAGE OF APPLES

Homer H. Plagge, deceased, late of Ames, Iowa, by Alma R. Plagge, administratrix de bonis non, Ames, Iowa, assignor, by direct and mesne assignments, of one-half to Iowa State College Research Foundation, Inc., Ames, Iowa, a corporation of Iowa, and one-half to The Goodyear Tire & Rubber Company, Akron, Ohio, a corporation of Ohio Application May 14, 1949, Serial No. 93,386

1 Claim. (Cl. 99—171)

This invention relates to the preservation and storage of fruit, and more particularly apples and pears, referred to generally herein as pomes. Such fruits are harvested in late summer or the fall and it has been customary to keep them in storage rooms at relatively low temperatures for use throughout the winter. By early or late spring they have lost sufficient moisture to cause shriveling, and various blights, etc. have taken their toll.

Storage in air-tight containers would preserve the moisture content, but all such fruits give off carbon dioxide during storage, and too high a concentration of carbon dioxide in the atmosphere in which they are stored causes physiological break-down of the fruit. To satisfactorily store such fruit it should be maintained at a relatively low temperature in an atmosphere of controlled carbon-dioxide concentration, and the loss of moisture should be prevented.

Such storage delays the maturing of the fruit. This is advantageous because fruit of retarded maturity is more resistant than fully matured fruit to the bruising to which it is subjected in shipping and subsequent handling. By storing at 30 to 38° F. in an atmosphere of controlled carbon-dioxide content, the maturing of the fruit may be retarded as much as a month or more. Consequently, it may be stored longer and marketed later than is now customary, if desired.

The optimum storage conditions vary. Apples are advantageously stored at about 36° F. and pears at about 30 to 31° F. Although for apples the carbon-dioxide content of the air within the storage container is preferably about 5 to 10 percent, for pears a concentration from 5 to 20 or 25 per cent is satisfactory. The rate at which carbon dioxide is given off by a fruit varies with the age of the fruit and the temperature at which it is stored, so it is difficult to maintain constant conditions within a storage container. For instance, freshly picked apples give off carbon dioxide much more readily than apples which are three or four weeks old. If packaged immediately after picking, the carbon dioxide content of the air in the storage container during the first several weeks will be much higher than subsequently. For this reason it may be desirable to postpone packing the apples in containers until after the initial period of several weeks in which carbon dioxide is rapidly evolved.

The storage container used for packaging fruit according to this invention is air pervious, such as, for example, a basket or crate or loosely fabricated barrel or box of the type now generally employed for fruit storage. The liner may be sealed around the fruit, but this is not necessary, because a tight fold such as a confectioner's fold, will hold the edges of the film together equally well for the purposes of this invention.

Any film liner sufficiently impervious to the passage of carbon dioxide to maintain the desired carbon-dioxide concentration within the container, may be used. Rubber hydrochloride film suitably plasticized is preferred. Film of vinyl chloride-vinyl acetate copolymer, suitably plasticized may be used. Thin cellulose acetate film suitably coated may be employed. Other films will be found suitable.

The suitability of a film does not vary with the size of the container. Film which maintains the desired carbon-dioxide content in a bushel of fruit stored under certain conditions will be equally satisfactory for lining a barrel for storage of the same fruit under the same conditions.

The gauge and plasticizer content of rubber hydrochloride film control its carbon-dioxide permeability. The following table illustrates the difference in carbon dioxide content maintained in storage containers filled with freshly picked apples stored at 36° F. after storage for different periods. The different rubber hydrochloride films are identified by code letters which are explained in the paragraph following the table. The films were not sealed, but the edges were simply folded tight to one another.

$CO_2$ concentration in apple containers during storage

| Film | Days in Storage | $CO_2$ in Container |
|---|---|---|
|  |  | percent |
| 140P6 | 5 | 8.05 |
|  | 13 | 20.1 |
|  | 14 | 21.45 |
|  | 17 | 8.95 |
| 120P6 | 5 | 7.85 |
|  | 13 | 19.9 |
|  | 14 | 21.8 |
|  | 17 | 5.55 |
| 75P6 | 6 | 9.9 |
|  | 8 | 12.8 |
|  | 14 | 21.9 |
|  | 17 | 5.55 |
| 75FF | 4 | 5.15 |
|  | 23 | 6.15 |
|  | 50 | 6.0 |
|  | 80 | 6.75 |
|  | 101 | 6.5 |
|  | 122 | 6.95 |
| 120FF | 4 | 6.3 |
|  | 8 | 9.5 |
|  | 16 | 10.0 |
|  | 23 | 9.3 |

In coding the films, the number preceding the letter indicates the gauge of the film, 100 gauge being .001 inch thick. "P6" represents film plasticized with 10 parts dibutyl phthalate and 5 parts of rubber hydrochloride. The "FF" film which is more permeable to carbon dioxide contains 15 parts of methoxyethyl oleate and 15 parts of dibutyl sebacate per 100 parts of rubber hydrochloride. The other three films in the above table have the same composition, but the first is .0014 inch thick, the second is .0012 inch thick, and the third is .00075 inch thick. The next two films which are of the more permeable composition are .00075 and .0012 inch thick, respectively. The first film in the gauges recorded is too impermeable for apple container liners. The other film in the thinner gauge, that is film .00075 inch thick and containing 15 parts of methoxyethyl oleate and 15 parts of dibutyl sebacate per 100 parts of rubber hydrochloride retains only sufficient carbon dioxide to maintain a preferred content of this gas which is somewhat lower than that retained by the 120-gauge film of this composition. Film of the latter gauge might be used as a liner for an apple container, but for storage at 36° F. is not as desirable as the thinner film.

Films of different gauge and different plasticizer content have different carbon-dioxide permeability. This is evidenced by the following table which includes not only the aforementioned rubber hydrochloride films, but also film identified as P4 which contains 10 parts of butyl stearate per 100 parts of rubber hydrochloride. The rate of carbon-dioxide diffusion is given as the number of cubic centimeters which pass through a sheet of 100 square inches under standard conditions in 24 hours.

$CO_2$ *permeability of rubber hydrochloride films*

| Film | Thickness | c. c. $CO_2$/ 100 in.²/24 hours |
|---|---|---|
| | inch | |
| FF | .00075 | 2,962 |
| | .00100 | 2,722 |
| | .00140 | 2,285 |
| | .00170 | 1,936 |
| P4 | .00120 | 1,006 |
| | .00140 | 586 |
| | .00170 | 333 |
| P6 | .00120 | 1,300 |
| | .00140 | 819 |
| | .00170 | 540 |

The above table illustrates the extent to which the escape of carbon dioxide may be controlled by using films of different thickness and films of different plasticizer content. Films of still other plasticizer content have different carbon-dioxide permeability.

The liner prevents loss of moisture vapor. Moisture-vapor loss is low with all rubber hydrochloride film. Other films may have low moisture-vapor transmission, or may be coated to give them low moisture-vapor transmission. Rubber hydrochloride film is preferred because it permits relatively high carbon-dioxide diffusion with low moisture loss.

Tests have shown that for Jonathan, Red Delicious, and Winesap apples at a temperature of 36° F. and a relative humidity of 86, a carbon-dioxide content of about seven per cent is preferred and five to eleven per cent is usable with advantageous results. For pears a carbon-dioxide content of five per cent up to 20 or perhaps 25 per cent is permissible. Thus, for pomes, generally, a carbon-dioxide content within the limits of five and 25 per cent is required. Different contents within this range are maintained by films of different gauge and composition.

The drawing illustrates a gas-permeable box 1 measuring 11½ inches wide by 10¾ inches high, and 17½ inches long, filled with 125 Golden Delicious apples 2, after being lined with 75FF film 3. After filling the apples into the lined containers the edges of the liner were overlapped and folded with twisting to prevent subsequent separation. On storage for three months at 36° F. the film reduced the weight loss to one-half or one-quarter of normal, and almost entirely eliminated shriveling. The results of individual paper wraps and a rubber-hydrochloride liner were compared. A box of paper-wrapped apples after storage under the described conditions yielded one bad apple, only 11 good apples and 113 shrivelled apples. The apples identically stored in the container with the rubber hydrochloride 75FF liner, averaged 5 slightly shrivelled, 33 green (retarded maturity), and 87 yellow (prime eating condition).

Storage containers for other fruits may be lined with suitable film to maintain a higher-than-normal level of carbon dioxide within the container at whatever temperature and humidity are desirable for that fruit.

What is claimed is:

A gas-permeable storage container having unwrapped apples therein and provided with a tight liner of rubber hydrochloride film no more than .0012 inch thick and containing 15 parts of methoxyethyl oleate and 15 parts of dibutyl sebacate per 100 parts of rubber hydrochloride.

ALMA R. PLAGGE,
*Administratrix de bonis non of the estate of Homer H. Plagge, deceased.*

REFERENCES CITED

The following references are of record in the file of this patent:

UNITED STATES PATENTS

| Number | Name | Date |
|---|---|---|
| 2,114,622 | Bergstein | Apr. 19, 1938 |
| 2,461,963 | Cheyney | Feb. 15, 1949 |

FOREIGN PATENTS

| Number | Country | Date |
|---|---|---|
| 116,197 | Australia | Nov. 24, 1942 |
| 117,842 | Australia | Nov. 30, 1943 |

OTHER REFERENCES

"Modern Packaging," November 1940, page 48, article entitled "New Celery Preserving Technique."

"Pliofilm in The Preservation of Florida Fruits and Vegetables," Bulletin 369, February 1942, by A. L. Stahl et al.

"Pre-Pack-Age," November 1947, page 32.

"Modern Packaging," June 1948, pages 163, 164, and 165, article entitled "Films for Cherries."